3,386,962
LOW MODULUS NCO-TERMINATED URETHANE
COMPOSITIONS
Adolfas Damusis, Detroit, Mich., assignor to Wyandotte Chemicals Corporation, Wyandotte, Mich., a corporation of Michigan
No Drawing. Filed May 13, 1964, Ser. No. 367,223
10 Claims. (Cl. 260—77.5)

ABSTRACT OF THE DISCLOSURE

The specification discloses an ordered NCO-terminated urethane composition useful in coating applications produced by (1) mixing and reacting an organic compound containing two active hydrogen atoms and having a molecular weight in the range of about 500 to 5,000 with an organic polyisocyanate to produce an isocyanato-terminated prethane intermediate and (2) mixing and reacting in the absence of a solvent the intermediate with a polyether polyol having from 3 to 6 hydroxyl groups and a molecular weight of about 300 to 6,000 (for each hydroxyl group), the mixing and reacting of the intermediate and the polyol being conducted in the presence of a medium consisting essentially of an excess of at least 25 weight percent, based on the total weight of the polyol and intermediate which interreact in step (2), of the intermediate.

---

This invention relates to novel ordered isocyanate-terminated urethane compositions which are especially useful as the isocyanate-terminated urethane component of one-package polyisocyanate surface coatings, for example air drying polyurethane coatings, or as one-component along with a hydroxy-terminated component in two-component polyurethane coatings or corresponding one-package systems in which they are employed in a blocked form along with the hydroxy-terminated component. The compositions of this invention are especially useful in one-component isocyanate-terminated urethane coating compositions in which they are the sole polyurethane forming components, the necessary second reactant being provided by moisture from the air.

One-component, moisture-cured, poly-based urethane formulations generally are high modulus products. However, in many applications such as sealing or caulking where the polyurethane composition must expand and contract, a low modulus material is necessary, and accordingly, one-component polyol based systems are not entirely satisfactory. The same is true with respect to coating compositions which are used on materials such as wood which is subject to swelling. In working on this problem it was recognized that one-component systems cure by reaction with moisture in the air. Since water is a low molecular weight material, the prepolymers must have a higher average equivalent weight than prepolymers used in two-component polyol-cured systems. Hence, polyols having three or more hydroxyl groups are predominantly used in one-component systems. However, such polyol isocyanate prepolymers are highly cross-linked and have high moduli. It was then found that one-component prepolymers formulated from diols have the desired low modulus but are generally unsatisfactory since they have poor solvent resistance and are thermoplastic. It was then determined that desirable properties might be obtained by formulating one-component polyurethanes from blends of diols and polyols. However, when the difunctional NCO-terminated prepolymer component was cross-linked with a polyol in a ratio of 1 mol of difunctional material per active hydrogen of the polyol, the mixture gelled and became hard almost immediately which prevented its successful application. Finally, a certain measure of success was achieved when the polyol and NCO-terminated difunctional prepolymer were blended in the presence of a solvent. Again, however, the use of solvents did not completely solve the problem since solvents are relatively expensive for use in low-cost formulations to be employed, such as sealing, caulking, and coating compositions. A greater disadvantage is the fact that solvents in many applications have an adverse effect on the adhesive properties of the polyurethane composition. For example, when the polyurethane composition is applied in a thick layer, as in caulking, the solvent in the interior portion cannot evaporate and, accordingly, tends to migrate to the surface thereby disrupting proper adhesion.

It is an object of the present invention to provide novel isocyanate-terminated urethane compositions. It is a further object to provide novel and ordered isocyanate-terminated urethane coatings for polyurethane coating systems which are of low modulus. It is a further object to provide such novel ordered low modulus urethane compositions which contain no solvents.

The foregoing and additional objects as may hereinafter appear are accomplished by forming in situ an NCO-terminated polyol prepolymer suspended in an NCO-terminated difunctional prepolymer. This novel ordered polyether-based NCO-terminated urethane composition is produced by first mixing and reacting together about one molar proportion of an organic compound having 2 active hydrogen atoms and having a molecular weight in the range of about 500 to 5000 with about two molar proportions of an organic polyisocyanate so as to produce an isocyanate-terminated urethane intermediate adduct and, secondly, mixing and reacting together about one molar proportion of said adduct with a polyether polyol having from 3 to 6 hydroxyl groups and a molecular weight of about 300 to 6000, for each hydroxyl group of the polyether polyol. The mixing and reaction of the adduct and polyether polyol is carried out in a medium of the isocyanate-terminated urethane intermediate adduct. The amount of the adduct which is used as the medium should be at least 25 weight percent based on the combined weight of the polyol and the mols of adduct which will react with the polyol, one mol of adduct reacting with each active hydrogen atom of the polyol. Preferably, the quantity of medium used is from 75 to 125 weight percent, said weight percent being determined as above. A greater quantity of medium can be used if desired.

The organic difunctional compound which is used as a reactant in making the composition of this invention has a molecular weight in the range of about 500 to 5000 and contains two reactive hydrogen atoms. The term "active hydrogen atoms" refers to hydrogens which, because of their position in the molecule, display activity according to the Zerewitinoff test as described by Kohler in J. Am. Chem. Soc., 49, 3181 (1927). The preferred classes of organic difunctional compounds are the polyester diols, hydroxy-terminated polyurethane polymers and polyether diols.

The active hydrogen atoms are usually attached to oxygen, nitrogen or sulphur atoms. Thus, suitable active hydrogen containing groups as determined by the Zerewitinoff method which are reactive with an isocyanate group include —OH, —NH—, —COOH, —SH and the like. Examples of suitable types of organic compounds containing two active hydrogen containing groups which are reactive with an isocyanate group are hydroxyl polyesters, dihydric polyalkylene ethers, hydroxy-terminated polyurethane polymers, dihydric polythioethers, polyacetals, aliphatic polyols, aliphatic thiols including alkane, alkene and alkyne thiols having two —SH groups; secondary diamines including both aromatic, aliphatic, and heterocyclic diamines, and the like; as well as mixtures thereof. Of course, compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group and the like.

Any suitable hydroxyl polyester may be used such as are obtained, for example, from polycarboxylic acids and polyhydric alcohols. Any suitable dicarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, 1,4-cyclohexane-dicarboxylic acid, and the like. Any suitable dihydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, and the like.

Any suitable dihydric polyalkylene ether may be used such as, for example, the condensation product of an alkylene oxide or of an alkylene oxide with a dihydric alcohol. Any suitable dihydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The dihydric polyalkylene ethers may have either primary or secondary hydroxyl groups and preferably are dihydric polyalkylene ethers prepared from alkylene oxides having from two to five carbon atoms such as, for example, polyethylene ether glycols, polypropylene ether glycols, polybutylene ether glycols and the like. The dihydric polyalkylene ethers may be prepared by any known process such as, for example, the process disclosed by Wurtz in 1859 and Encyclopedia of Chemical Technology, vol. 7, pp. 257–262, published by Interscience Publishers Inc. (1951) or in U.S. Patent 1,922,459.

Any suitable dihydric polythioether may be used such as, for example, the condensation product of thiodiglycol or the reaction product of a dihydric alcohol such as is disclosed above for the preparation of the hydroxyl polyesters with any other suitable thioether glycol.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a dihydric alcohol such as those disclosed above for use in the preparation of the hydroxyl polyesters.

Any suitable aliphatic thiol including alkane thiols containing two —SH groups may be used such as, for example, 1,2-ethane dithiol, 1,2-propane dithiol, 1,3-propane dithiol, 1,6-hexane dithiol, and the like; alkene thiols such as, for example, 2-butene-1,4-dithiol and the like; alkyne thiols such as, for example, 3-hexyne-1,6-dithiol and the like.

Any suitable polyamine may be used including for example, aromatic polyamines such as, for example, p-amino aniline, 1,5-secondary diamino naphthalene, 2,4-secondary diamino toluylene, and the like; aliphatic polyamines such as, for example, N,N'-secondary ethylene diamine, N,N'-secondary 1,3-propylene diamine, N,N'-secondary 1,4-butylene diamine, or N,N'-secondary 1,3-butylene diamine, and the like.

Other compounds which do not necessarily fit within any of the previously set forth classes of compounds which are quite suitable in the production of the compounds of this invention include the hydroxy-terminated polyurethane polymers such as a hydroxy-terminated polymer made by reacting an isocyanate with several mols of an alkylene glycol.

Linear compounds containing hydrocarbon groups linked together by ether linkages and having terminal hydroxyl groups are the most preferred representatives of the difunctional compounds of this invention. A particularly useful class of active hydrogen containing compounds for this purpose are the polyalkylene ether glycols which have the general formula $H(OR)_nOH$ where R is an alkylene radical and $n$ is an integer sufficiently large that the compound as a whole has a molecular weight of about 500 to 5000. Polyethylene ether glycols, poly-1,2-propylene ether glycol, polytetramethylene ether glycol, poly-1,2-dimethylene ether glycol, and polydecamethylene ether glycols are typical members of this class. Not all of the alkylene radicals present need to be the same. Glycols containing a mixture of radicals as in the compound $HO(CH_2OC_2H_4O)_nH$, or $$HO(C_2H_4O)_n(C_3H_6O)_m(C_2H_4O)_nH$$

wherein $n$ and $m$ are together sufficient for attainment of the desired molecular weight can be used. Polyethylene ether polypropylene ether glycols, having the above indicated formula, are among the preferred glycols. Characteristics of representative preferred polyalkylene or polyalkylene ether glycols including hydroxyl numbers and molecular weights are found in Table A below.

Table A.—Typical properties of representative preferred polyalkylene ether glycols

| Glycol | Percent Polyoxyethylene | M. Wt. of Polyoxypropylene Base | Hydroxyl Number | Molecular Wt. |
|---|---|---|---|---|
| Polyoxyethylene-polyoxypropylene glycols: | | | | |
| L31 | 15 | 940 | 102.3 | 1,065 |
| L61 | 15 | 1,750 | 56.1 | 2,000 |
| L81 | 15 | 2,250 | 41.7 | 2,690 |
| P75 | 50 | 2,050 | 27.3 | 4,120 |
| Polyoxypropylene glycols: | | | | |
| PPG 765 | 0 | | 145.0 | 765 |
| PPG 1000 | 0 | | 112.0 | 1,000 |
| PPG 2000 | 0 | | 56.4 | 1,995 |

When the compounds of this invention are to be used as coatings then the preferred molecular weight of the difunctional compound is from about 600 to 1000. If they are to be used as sealants then the preferred molecular weight is from about 1000 to 3000.

The polyether polyol which is used as a reactant in making the compositions of this invention is the product of the sequential addition of ethylene oxide, propylene oxide and/or butylene oxide or mixtures thereof to a polyhydric alcohol until a polymer having a molecular weight of about 300 to 6000 is produced. Thus, if an alkylene oxide adduct of an alcohol having three hydroxyl groups is used, then the adduct could contain about 40 oxyalkylene groups per hydroxyl.

The polyhydric alcohol employed in the preparation of the polyether polyol may be an alkanol or phenol and contain about 3 to 6 hydroxy groups and about 3–20 carbon atoms as, for example glycerol, 1,1,1-trimethylolpropane, 1,1,1-trimethylol ethane, hexane 1,2,6-triol, pentaerythritol and sorbitol.

Any of a wide variety of organic polyisocyanates may be used in this invention including aromatic, aliphatic and cycloaliphatic polyisocyanates and combinations of these types. Representative of these types are the diisocyanates such as m-phenylene diisocyanate, toluene-2,4-diisocyanate, hexamethylene-1,6-diisocyanate, tetramethylene-1,4-diisocyanate, cyclohexane-1,4-diisocyanate, naphthylene-1,5-diisocyanate, 1 - methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenyl methane diisocyanate, polymethylene polyphenylisocyanate, and toluene 2,4,6-triisocyanate and the tetraisocyanates such as 4,4'-dimethyldiphenyl methane 2,2',5,5'-tetraisocyanate.

In producing polyols by the present invention the organic difunctional compound is first reacted with a polyisocyanate so as to produce an NCO-terminated polyurethane adduct of the following abbreviated formula:

(1) 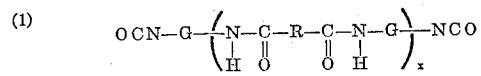

wherein R is an organic difunctional compound having a molecular weight of about 500 to 5000, $x$ is an integer such that the total molecular weight of the adduct is about 500 to 5000 and G is the nucleus of the polyisocyanate compound. Thus, R may be poly-1,2-propylene ether glycol or polydecamethylene ether glycol and G a phenylene or naphthylene radical, assuming M-phenylene diisocyanate or naphthylene-1,5-diisocyanate was used as the polyisocyanate. The adduct is prepared in the first stage at an equivalent ratio of NCO/OH of about 2/1 to 1.25/1 and contains terminal free NCO groups, only half of the NCO groups taking part in the reaction. In this stage, moisture and temperature conditions must be carefully controlled.

In the second stage a polyether polyol having from 3 to 6 hydroxyl groups and a molecular weight of about 300 to 6000 is reacted with the above described NCO-terminated adduct I. Representing the polyether polyol by the formula, (2) 

where $y$ is an integer from 3 to 6, the resulting NCO-terminated urethane composition has the formula, (3) 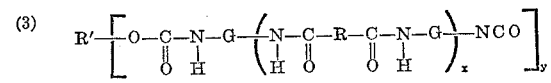

The quantity of polyether polyol and NCO-terminated adduct inter-reacted is such that there is one molar proportion of the NCO-terminated polyurethane adduct to each active hydrogen atom of the polyether polyol. For example, three molar proportions of the NCO-terminated polyurethane adduct would be reacted with one molar proportion of a triol. At this point attention is directed to the fact that simply adding the polyether polyol to the NCO-terminated polyurethane adduct, both of which are liquids, in a ratio of 1 mol of adduct per each active hydrogen of the polyol will result in the formation of a solid NCO-terminated urethane composition. Naturally, such a solid is of no use for commercial coating and sealant applications. However, it was quite unexpectedly discovered that if the NCO-terminated polyurethane adduct and the polyether polyol were inter-reacted in a medium of the NCO-terminated polyurethane adduct then the resulting NCO-terminated reaction product did not become hard, but rather, was suspended in the adduct medium and the formulation was a flowable composition ideally suited for coating and sealant applications.

The reason why the urethane composition of this invention is a liquid is not fully understood. As mentioned earlier, merely reacting the NCO-terminated polyurethane adduct with the polyether polyol in quantities such that there is only one molar proportion of the adduct per each hydroxyl group of the polyether polyol results in the formation of the solid adduct. Furthermore, when an NCO-terminated polyurethane adduct was added to this solid adduct it was impossible to blend the two materials so as to achieve the flowable suspension resulting from the in situ formation of the compositions of this invention.

The quantity of NCO-terminated polyurethane adduct which should be used as the reaction medium is about at least 25 weight percent of the combined weight of the polyether polyol and the NCO-terminated polyurethane adduct which are to be inter-reacted. Preferably, a quantity of reaction medium amounting to about 75 to 125 weight percent of the combined weight of the polyether polyol and adduct is used in the composition of this invention. Since no solvent is used in the preparation of the composition of this invention it has 100 percent solid content and no solvent adhesion problems are presented in its use.

In preparing the compositions of this invention it may be desirable to use a catalyst when the polyether polyol and the NCO-terminated polyurethane adduct are inter-reacted. Good results have been achieved with the use of organometallic catalyst such as dibutyl tin diacetate, dibutyl tin dilaurate, dibutyl tin di-2-ethylhexoate, stannous octoate, stannous oleate and stannous 2-ethylhexoate and mixtures of the foregoing. However, other catalysts of equal activity can be used. In general, the quantity of catalysts used should be between about 0.005 and 0.03 weight percent based on the total weight of the composition components and preferably between about 0.01 to 0.02 weight percent.

The properties of the composition of this invention may be varied by suitable compounding. The amount and type of compounding agent to be incorporated is dependent upon the use for which the composition is intended. Useful compounding agents include carbon black, silicia, talc, calcium and magnesium carbonate, titanium dioxide and plasticizers. Inorganic and organic agents may be incorporated to give well-defined colors. The compounding agents should be essentially moisture-free and can be added to the formulation at any stage prior to the inter-reaction of the polyether and the NCO-terminated polyurethane adduct.

The following examples will better illustrate the nature of the present invention; however, the invention is not intended to be limited to these examples.

EXAMPLE I

Stage I.—Six mols (43.6% by weight) of polypropylene ether glycol having a molecular weight of about 1995 (Pluracol P–2010), 5.9% by weight of titanium dioxide, 1.4% by weight of zinc oxide and 21.6% by weight of talc were stripped of water by heating the mixture for one hour at 70–95° C. and 20 mm. vacuum. The above mixture was transferred to a 5-liter reaction flask under a nitrogen blanket and twelve mols (7.6 weight percent) of toluene diisocyanate (TDI) were gradually added thereto while stirring. The temperature was kept at about 70° C. by cooling the vessel with cold water and/or by the gradual addition of the TDI to the Pluracol P–2010. After the exothermic reaction was finished, the contents were maintained at 70° C. for about 2 hours with continued mixing. The abbreviated formula of the adduct I at this stage is:

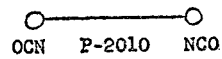

OCN    P-2010    NCO the circles representing the diisocyanate molecules, urethane linkages being omitted.

Stage II.—One mole of a polyoxypropylene derivative of trimethylolpropane having a molecular weight of about 4100 (Pluracol TP-4040), and 0.01% by weight of stannous octoate were gradually added to the adduct I. The mixture was heated to about 80-95° C. and stirred for about 3 hours. The resulting novel ordered NCO-terminated urethane product has the abbreviated formula:

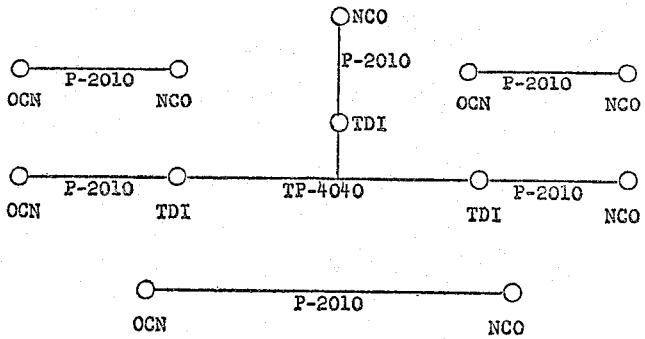

the NCO-terminated triol being suspended in about 63 weight percent of NCO-terminated diol. The suspension weighed 10.7 pounds per gallon and had a Brookfield viscosity at 25° C. of 3100 c.p.s.

The above urethane formulation was cast as a film of approximately ⅛ inch thickness and allowed to cure by reaction with moisture in the atmosphere. The properties of the film are given in Table 1.

Table 1

Properties:
- Dry to touch (60% R.H.—70° F.) _____ 2 hours.
- Shelf stability _____ Unaffected after 4 mo.
- Tensile strength, p.s.i. _____ 620.
- 100% modulus, p.s.i. _____ 106.
- Elongation, percent _____ 900.
- Elongation set, percent _____ 7.
- Shore A hardness:
  - (a) Instantaneous _____ 44.
  - (b) After 5 seconds _____ 42.
- Split tear, p.i. _____ 32.
- Swelling in toluene, volume percent _____ 428.
- Heating aging (100° C.—72 hours) _____ Unaffected.

EXAMPLE II

Stage I.—The preparation procedure was identical to the procedure of Example I. Six mols (60% by weight) of polypropylene ether glycol having a molecular weight of about 1995 (Pluracol P-2010), 8.0% by weight of titanium dioxide, 2.0% by weight of zinc oxide and 30% by weight of talc were stripped of water. Twelve mols of toluene diisocyanate (TDI) were then gradually added thereto, thereby forming adduct I having the formula:

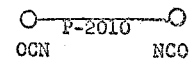

Stage II.—The preparation procedure used during this stage was identical to that used in Example I. One mole of a polyoxypropylene derivative of trimethylolpropane having a molecular weight of about 2670 (Pluracol TP-2540) and 0.02 weight percent (3.3 parts) of stannous octoate were gradually added to six mols of the adduct I. The resulting novel ordered NCO-terminated urethane product had the abbreviated formula:

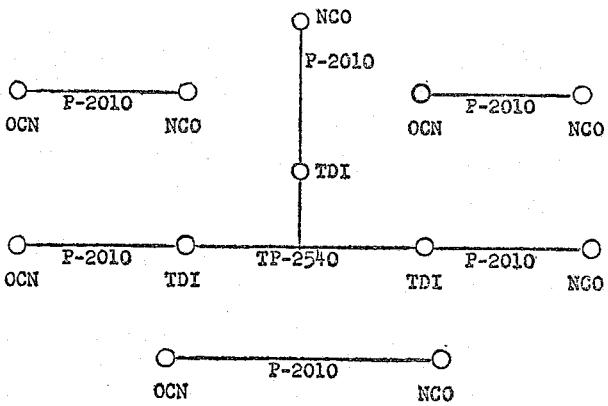

the NCO-terminated triol being suspended in about 72.5 weight percent of NCO-terminated diol. The suspension weighed 10.8 pounds per gallon and had a Brookfield viscosity at 25° C. of 6200 cps.

The above urethane formulation was cast as a film of approximately ⅛ inch thickness and allowed to cure by reaction with moisture in the atmosphere. The properties of the film are shown below in Table 2.

EXAMPLE III

Stage I.—The preparation procedure was identical to the procedure of Example I. Six mols (60% by weight) of polypropylene ethyl glycol having a molecular weight of about 1995 (Pluracol P-2010), 8.0% by weight of titanium dioxide, 2.0% by weight of zinc oxide and 30% by weight of talc were stripped of water. Twelve mols of toluene diisocyanate (TDI) were then gradually added thereto thereby forming adduct I having the formula:

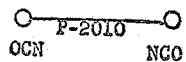

Stage II.—The preparation procedure used during this stage was identical to that used in Example I. One mole of a polyoxypropylene derivative of trimethylolpropane having a molecular weight of about 300 (Pluracol TP- 340) and 0.2 weight percent of stannous octoate were gradually added to six mols of the adduct I. The resulting novel ordered NCO-terminated urethane product had the abbreviated formula:

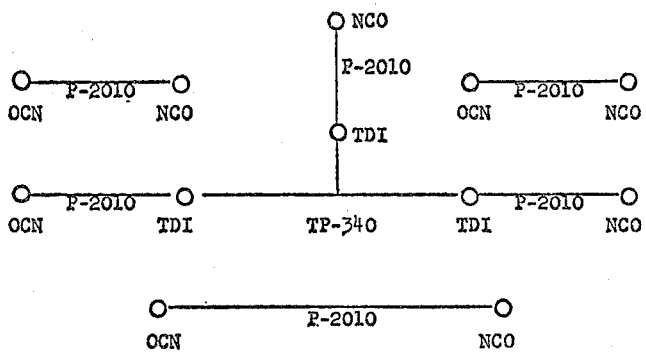

the NCO-terminated triol being suspended in about 96 weight percent of NCO-terminated diol. The suspension weighed about 11.2 pounds per gallon and had a Brookfield viscosity at 25° C. of 7600 cps.

The above urethane formulation was cast as a film of approximately ⅛ inch thickness and allowed to cure by reaction with moisture in the atmosphere. The properties of the film are shown below in Table 2.

EXAMPLE IV

Stage I.—The preparation procedure was identical to the procedure of Example I. Six moles (60% by weight) of polypropylene ether glycol having a molecular weight of about 775 (Pluracol P–710), 8.0% by weight of titanium dioxide, 2.0% by weight of zinc oxide and 30% by weight of talc were stripped of water. Twelve moles of toluene diisocyanate (TDI) were then gradually added thereto, thereby forming adduct I having the formula:

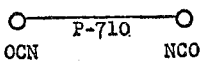

Stage II.—The preparation procedure used during this stage was identical to that used in Example I. One mole of a polyoxypropylene derivative of trimethylolpropane having a molecular weight of about 300 (Pluracol TP–340) and 0.02 weight percent of stannous octoate were gradually added to six mols of the adduct I. The resulting novel ordered NCO-terminated urethane product had the abbreviated formula:

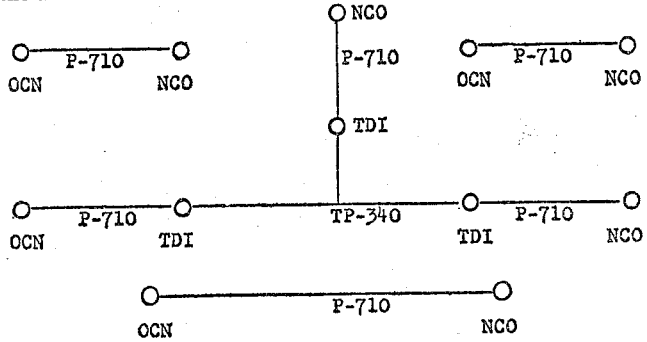

the NCO-terminated triol being suspended in about 94 weight percent of NCO-terminated diol. The suspension weighed about 11 pounds per gallon and had a Brookfield viscosity at 25° C. of 10,800 cps.

The above urethane formulation was cast as a film and allowed to cure by reaction with moisture in the atmosphere. The properties of the film are shown below in Table 2.

EXAMPLE V

The compositions prepared in this example contained no pigments. The method of preparation was identical to that of Example I.

Stage I.—Six mols of polypropylene ether glycol having a molecular weight of about 1995 (Pluracol P–2010) were stripped of water by azeotropic distillation with benzene. After the distillation the amount of water remaining in the diol was less than 0.02%. Twelve mols of toluene diisocyanate (TDI) were then gradually added to the glycol thereby forming adduct I having the formula:

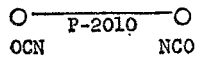

Stage II.—The preparation procedure used during this stage was identical to that used in Example I. One mol of a polyoxypropylene derivative of trimethylolpropane having a molecular weight of about 300 (Pluracol TP–340) and 0.02 weight percent of stannous octoate were gradually added to the adduct I. The resulting novel ordered NCO-terminated urethane product had an abbreviated formula identical to that shown for the product in Example III. The NCO-terminated triol was suspended in about 96 weight percent of NCO-terminated diol and the suspension weighed about 8.5 pounds per gallon and had a Brookfield viscosity at 25° C. of 3600 c.p.s.

The above urethane formulation was cast as a film of approximately ⅛ inch thickness and allowed to cure by reaction with moisture in the atmosphere. The properties of the film are shown below in Table 2.

EXAMPLE VI

The composition prepared in this example contained no pigments. The method of preparation was identical to that of Example I.

Stage I.—Six mols of polypropylene ether glycol having a molecular weight of about 775 (Pluracol P–710) were stripped of water by azeotropic distillation of benzene. After the distillation the amount of water remaining in the diol was less than 0.02%. Twelve mols of toluene diisocyanate (TDI) were then gradually added to the glycol thereby forming adduct I having the formula:

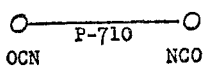

Stage II.—The preparation procedure used during this stage was identical to that used in Example I. One mol of a polyoxypropylene derivative of trimethylolpropane having a molecular weight of about 300 (Pluracol TP-340) and 0.02 weight percent of stannous octoate were gradually added to six mols of the adduct I. The resulting novel ordered NCO-terminated urethane product had an abbreviated formula identical to that shown for the product in Example IV. The NCO-terminated triol was suspended in about 92 weight percent of NCO-terminated diol and the suspension weighed about 8.5 pounds per gallon and had a Brookfield viscosity at 25° C. of 4800 cps.

The above urethane formulation was cast as a film of approximately ⅛ inch thickness and allowed to cure by reaction with moisture in the atmosphere. The properties of the film are shown below in Table 2.

EXAMPLE VII

This example illustrates the use of the NCO-terminated urethane compositions of this invention in a two-component system wherein the composition of this invention is cured by reaction with a hydroxy-terminated component. The NCO-terminated urethane composition of this invention was prepared in two stages by a procedure identical to that used in Example I.

Stage I.—Six mols of polypropylene ether glycol having a molecular weight of about 775 (Pluracol P-710) was stripped of water by azeotropic distillation. Twelve mols of toluene diisocyanate (TDI) were then gradually added to the glycol thereby forming adduct I having the formula:

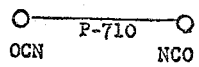

Stage II.—One mol of a polyoxypropylene derivative of trimethylolpropane having a molecular weight of about 300 (Pluracol TP-340) was gradually added to the six mols of adduct I. The resulting novel ordered polyether-based NCO-terminated urethane product had an abbreviated formula identical to the product formula shown in Example IV, with the NCO-terminated triol being suspended in about 92 weight percent of NCO-terminated diol.

At this point the above NCO-terminated urethane product was blended with about 4.5 mols of polypropylene ether glycol having a molecular weight of 400 (Pluracol P-410) and 0.4% of stannous octoate. This blend was then cast as a film and allowed to cure. The properties of the film are given in Table 3.

Table 3
Properties:
- Tensile strength, p.s.i. _____ 518
- 100% modulus, p.s.i. _____ 261
- Elongation, percent _____ 340
- Shore A hardness:
  - (a) Instantaneous _____ 60
  - (b) After 5 seconds _____ 50
- Split tear, p.i. _____ 40
- Heat aged (66° C.—168 hrs.):
  - (a) Tensile strength, p.s.i. _____ 528
  - (b) 100% modulus, p.s.i. _____ 205
  - (c) Elongation, percent _____ 540

EXAMPLE VIII

Stage I.—The preparation procedure used in making the composition of this example was identical to the procedure of Example I. Twelve mols of a polyoxypropylene derivative of 4,4'-dihydroxydiphenyl dimethyl methane (bisphenol A) having a molecular weight of 1000 and the formula,

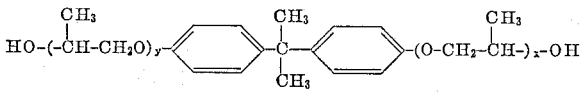

8.0% by weight of titanium dioxide, 2.0% by weight of zinc oxide and 30% by weight of talc were stripped of water. Twenty-four mols of toluene diisocyanate (TDI) were then gradually added thereto thereby forming the NCO-terminated adduct.

Stage II.—Using a procedure identical to that described in Example I, one mol of a polyoxypropylene derivative of sorbitol having a molecular weight of 690 (Pluracol SP-760), and 0.02% of dibutyltin dilaurate were gradually added to the twelve mols of adduct prepared in Stage I. The resulting novel ordered polyether-based NCO-terminated urethane product consisted of the NCO-terminated hexol suspended in about 92 weight percent of NCO-terminated diol. The suspension weighed about 11.2 pounds per gallon and had a Brookfield viscosity at 25° C. of 18,600 cps.

TABLE 2

| Example | Composition of Polymer | Tensile Strength (p.s.i.) | 100% Modulus (p.s.i.) | Elongation, percent | Elongation Set, percent | Shore A Hardness | | Split Tear (p.i.) |
|---|---|---|---|---|---|---|---|---|
| | | | | | | Inst. | 5 sec. | |
| II | 6 M P-2010 / 1 M TP-2540 / 12 M TDI | 764 | 182 | 700 | 5 | 57 | 55 | 32 |
| III | 6 M P-2010 / 1 M TP-340$$ / 12 M TDI | 768 | 292 | 573 | 4 | 62 | 58 | 34 |
| IV | 6 M P-710 / 1 M TP-340 / 12 M TDI | 1,060 | | 88 | 2 | 78 | 77 | 68 |
| V | 6 M P-2010 / 1 M TP-340 / 12 M TDI | 250 | 176 | 175 | 4 | 56 | 54 | 19 |
| VI | 6 M P-710 / 1 M TP-340 / 12 M TDI | 805 | | 75 | 2 | 74 | 72 | 71 |

An antioxidant (Ionol), 2,6-di-t-butyl-4-methylphenol in the amount of 0.1 weight percent and 0.3 weight percent of trimethylpiperazine were added to the urethane formulation and it was cast as a film and allowed to cure by reaction with moisture in the atmosphere. The properties of the film are shown in Table 4.

Table 4
Properties:
- Tensile strength, p.s.i. _____ 980
- 100% modulus, p.s.i. _____ 710
- Elongation, percent _____ 135
- Elongation set, percent _____ 0
- Shore A hardness:
  - Instantaneous _____ 70
  - After 5 seconds _____ 68
- Split tear, p.i. _____ 55

EXAMPLE IX

In this example a hydroxy terminated polyurethane prepolymer was used in preparing the NCO-terminated diol component of the desired product. The hydroxy terminated prepolymer was prepared by blending three mols of polypropylene ether glycol having a molecular weight of 775 (Pluracol P-710) with two mols of toluene diisocyanate (TDI) and heating the blend for about three hours at a temperature of about 80° C. The abbreviated formula of the OH-terminated trimer so prepared is:

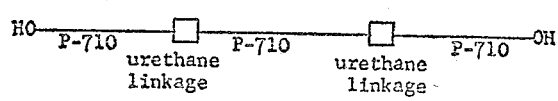

Stage I.—In a procedure identical to that used in Example I, twelve mols of toluene diisocyanate (TDI) were gradually added to six mols of the trimer thereby producing an NCO-terminated trimer.

Stage II.—One mol of a polyoxypropylene derivative of trimethylolpropane having a molecular weight of about 2670 (Pluracol TP-2540) and 0.02% of dibutyltin dilaurate were gradually added to 6 mols of the NCO-terminated trimer. The resulting novel ordered polyether-based NCO-terminated urethane product consisted of the NCO-terminated triol suspended in about 77 weight percent of NCO-terminated trimer. The suspension weighed 8.6 pounds per gallon and had a Brookfield viscosity at 25° C. of 15,400 cps.

An antioxidant (Ionol) in the amount of 0.1 weight percent was added to the urethane formulation and it was cast as a film and allowed to cure by reaction with moisture in the atmosphere. The properties of the film are shown in Table 5.

Table 5

Properties:
Tensile strength, p.s.i. _____ 655
100% modulus, p.s.i. _____ 168
Elongation, percent _____ 603
Elongation set, percent _____ 6
Shore A hardness:
  Instantaneous _____ 50
  After 5 seconds _____ 46
Heat aged (100° C.—72 hrs.):
  (a) Tensile strength, p.s.i. _____ 776
  (b) 100% modulus, p.s.i. _____ 187
  (c) Elongation, percent _____ 597
  (d) Elongation set, percent _____ 5
  (e) Shore A hardness:
    Instantaneous _____ 52
    After 5 seconds _____ 50

EXAMPLE X

This example illustrates the use of the NCO-terminated urethane compositions of this invention in a two-component system wherein the composition of this invention is used by reaction with a hydroxy-terminated component. The NCO-terminated urethane composition of this invention was prepared in two stages by a procedure identical to that used in Example I.

Stage I.—Seven mols of a polyoxypropylene derivative of 4,4'-dihydroxydiphenyl dimethyl methane (bisphenol-A) having a molecular weight of 2000 was stripped of water by azeotropic distillation. Fourteen mols of 4,4'-diphenyl methane diisocyanate (MDI) were then gradually added to the diol thereby forming the NCO-terminated adduct.

Stage II.—One mol of a polyoxypropylene derivative of pentaerythritol having a molecular weight of about 600 (Pluracol PeP-650) was gradually added to the seven mols of NCO-terminated adduct prepared in Stage I. The resulting novel ordered polyether-based NCO-terminated urethane product consisted of the NCO-terminated tetrol suspended in about 70 weight percent of NCO-terminated diol and had the abbreviated formula:

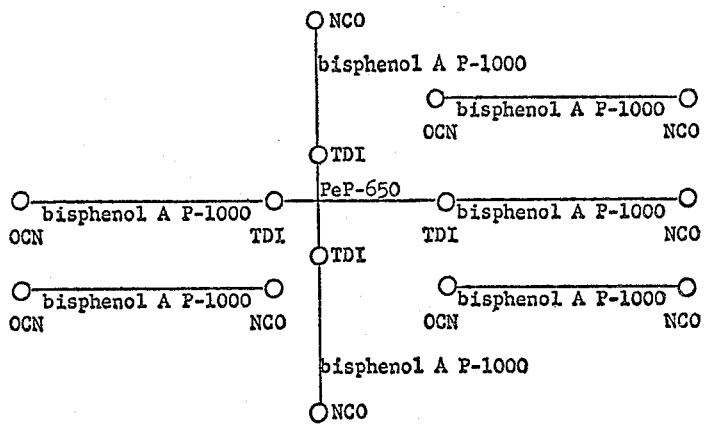

At this point the above NCO-terminated urethane product was blended with about 5 mols of a polyoxypropylene derivative of 4,4'-dihydroxydiphenyl dimethyl methane (bisphenol-A) having a molecular weight of 1000, 0.4% of lead naphthenate and 0.1% of an antioxidant (Ionol). This blend was then cast as a film and allowed to cure. The properties of the film are given in Table 6.

Table 6

Properties:
Tensile strength, p.s.i. _____ 360
100% modulus, p.s.i. _____ 210
Elongation, percent _____ 380
Shore A hardness:
  Instantaneous _____ 62
  After 5 seconds _____ 60
Heat aged (100° C.—72 hrs.):
  (a) Tensile strength, p.s.i. _____ 380
  (b) 100% modulus, p.s.i. _____ 201
  (c) Elongation, percent _____ 460

While there has been shown and described hereinabove the present preferred embodiments of this invention, it is to be understood that various changes, alterations and modifications can be made thereto without departing from the spirit and scope thereof as defined in the appended claims.

Briefly stated, this invention relates to a new and novel polyurethane composition comprising an NCO-terminated polyol suspended in an NCO-terminated difunctional prepolymer. These compositions possess the most attractive properties of both NCO-terminated diol and triol prepolymers which were formerly unattainable in a single solventless polyurethane composition.

I claim:
1. An ordered NCO-terminated urethane composition produced by first mixing and reacting about one molar proportion of an organic compound containing two active hydrogen atoms as determined by the Zerewitinoff method and having a molecular weight in the range of about 500 to 5,000 with about two molar proportions of an organic diisocyanate so as to produce an isocyanate-terminated urethane intermediate adduct; and, secondly, mixing and reacting in the absence of a solvent about one molar proportion of said adduct with a polyether polyol having from 3 to 6 hydroxyl groups and a molecular weight of about 300 to 6000, for each hydroxyl group of the polyether polyol, said mixing and reacting of said adduct and said polyether polyol being conducted in the presence of a medium consisting essentially of an excess of at least 25 weight percent based on the total weight of the polyol and adduct which interreact in said second step of the said isocyanate-terminated urethane intermediate adduct.

2. An ordered NCO-terminated urethane composition in accordance with claim 1 wherein the organic compound is selected from the group consisting of a polyester diol, a hydroxy-terminated polyurethane polymer and a polyalkylene ether glycol, wherein the organic diisocyanate is selected from the group consisting of toluene diisocyanate, tetramethylene-1,4-diisocyanate, cyclohexane-1,4-diisocyanate, diphenylmethane-4,4'-diisocyanate, 3,3'-dimethoxy-4,4'-biphenyl diisocyanate, 3,3'-dimethyl-4,4'-diphenyl diisocyanate, and 3,3'-dimethyldiphenylmethane-4,4'-diisocyanate, and wherein the polyether polyol is an alkylene oxide addition product of a member selected from the group consisting of trimethylolpropane, pentaerythritol, hexane triol, sorbitol and glycerol.

3. An ordered NCO-terminated urethane composition according to claim 1 wherein the organic compound is polypropylene ether glycol, the organic diisocyanate is toluene diisocyanate and the polyether polyol is an alkylene oxide addition product of trimethylolpropane.

4. An ordered NCO-terminated urethane composition according to claim 1 wherein the organic compound is polypropylene ether glycol, the organic diisocyanate is toluene diisocyanate and the polyether polyol is an alkylene oxide addition product of pentaerythritol.

5. An ordered NCO-terminated urethane composition according to claim 1 wherein the organic compound is polypropylene ether glycol, the organic diisocyanate is toluene diisocyanate and the polyether polyol is an alkylene oxide addition product of glycerine.

6. An ordered NCO-terminated urethane composition according to claim 1 wherein the organic compound is polypropylene ether glycol, the organic diisocyanate is toluene diisocyanate and the polyether polyol is an alkylene oxide addition product of sorbitol.

7. A urethane coating comprising an NCO-terminated urethane composition of claim 1 cured with a hydroxy-terminated component.

8. An ordered polyether-based NCO-terminated urethane composition produced by first mixing and reacting about one molar proportion of polyalkylene ether glycol having a molecular weight in the range of about 500 to 5000 with about two molar proportions of an organic diisocyanate so as to produce an isocyanate-terminated polyether-based urethane intermediate adduct; and secondly, mixing and reacting in the absence of a solvent about one molar proportion of said adduct with an alkylene oxide addition product of a lower aliphatic alcohol having at least 3 and not more than 6 hydroxy groups in the molecule, the addition product having a molecular weight of about 300 to 6000, for each hydroxyl group of the addition product; said mixing and reacting of said adduct and said addition product being conducted in the presence of a medium consisting essentially of an excess of at least 25 weight percent, based on the total weight of the addition product and adduct which will interreact in said second step, of the said isocyanate-terminated polyether-based urethane intermediate adduct.

9. An ordered polyether-based NCO-terminated urethane composition according to claim 8 wherein the polyalkylene ether glycol is polypropylene ether glycol formed by adding propylene oxide to a propylene glycol nucleus.

10. An ordered polyether-based NCO-terminated urethane composition according to claim 8 wherein the polyalkylene ether glycol has the formula:

$$HO(C_2H_4O)_n(C_3H_6O)_m(C_2H_4O)_nH$$

wherein the sum of $n$ and $m$ is sufficient to provide a glycol having a molecular weight in the range of about 500 to 5000.

References Cited

UNITED STATES PATENTS

| | | | |
|---|---|---|---|
| 3,049,515 | 8/1962 | Damusis | 260—77.5 |
| 3,049,516 | 8/1962 | Damusis | 260—77.5 |
| 3,159,604 | 12/1964 | Rudkin et al. | 260—75 |
| 3,164,572 | 1/1965 | Axelrood | 260—77.5 |

FOREIGN PATENTS

| | | |
|---|---|---|
| 535,230 | 1/1957 | Canada. |
| 603,424 | 8/1960 | Canada. |
| 625,891 | 8/1961 | Canada. |
| 1,328,429 | 4/1963 | France. |
| 974,626 | 11/1964 | Great Britain. |

OTHER REFERENCES

Modern Plastic, volume 31, Number 7, March 1954, page 49.

Technical Bulletin #SC:59–18R, received in Group 140, Mar. 20, 1967.

Bulletin of the Shell Chemical Company, 8 pages cited as being of interest.

DONALD E. CZAJA, *Primary Examiner.*

F. McKELVEY, *Assistant Examiner.*